No. 733,729. Patented July 14, 1903.

UNITED STATES PATENT OFFICE.

GEORGE W. MILES, OF BELMONT, MASSACHUSETTS, ASSIGNOR TO FRANK L. PIERCE, TRUSTEE, OF BROOKLYN, NEW YORK.

PROCESS OF MAKING CELLULOSE ESTERS.

SPECIFICATION forming part of Letters Patent No. 733,729, dated July 14, 1903.

Application filed May 27, 1901. Serial No. 62,060. (No specimens.)

*To all whom it may concern:*

Be it known that I, GEORGE W. MILES, a citizen of the United States, residing at Belmont, in the county of Middlesex and State of Massachusetts, have invented a new and Improved Method for the Production of Cellulose Esters, of which the following is a specification.

My invention relates to the production of cellulose esters of monobasic fatty acids by treating cellulose with the anhydrids of these acids or with reagents from which such anhydrids may be derived.

More specifically my invention relates to the production of cellulose esters of monobasic fatty acids by treating cellulose with the anhydrids of these acids or with reagents from which such anhydrids may be derived under conditions as to temperature and treatment which not only permit the esterification of normal cellulose, such as cotton fiber, but also conserve to a high degree the aggregation and integrity of the cellulose molecules upon which the desirable physical properties of the cellulose esters in large part depend. The anhydrid at present most readily available in practice is acetic anhydrid. This specification will therefore mainly be addressed to the application of the process of my invention to the production of cellulose acetates, the process thus applied being typical of the general process and the cellulose acetates being typical of the cellulose esters of the monobasic fatty acids.

I am aware that cellulose acetates have been produced by various processes involving first as an essential preliminary the conversion of the comparatively inert normal or fibrous cellulose into a more reactive modification—as, for example, cellulose hydrate. Certain of these processes have, moreover, been further complicated by the presence during the reaction of restraining agents or diluents the removal of which thereafter from the cellulose acetate produced involves additional difficulty and expense. Such attempts as have been made to produce the acetates from fibrous or normal cellulose through the direct agency of acetic anhydrid, either with or without the aid of condensing agents—as, for example, zinc chlorid—have been failures by reason of the degradation of the cellulose under the action of the anhydrid at the high temperatures heretofore regarded as necessary for the esterification. The minute quantities of acetate or other acetylized compounds thus experimentatly produced are brittle and worthless and the yield is small.

I have discovered that normal or fibrous cellulose can be converted into cellulose esters wherein the molecular aggregation and integrity peculiar to cellulose is substantially conserved—that is to say, wherein the cellulose molecules are not decomposed or broken up, as is the case, for instance, where glucoses are formed—by combining normal or fibrous cellulose and the anhydrid of a monobasic fatty acid in the presence of an anhydrous substance, which if used in association with water and cellulose will bring about hydrolysis of the cellulose. In other words, I have discovered that those substances which will bring about hydrolysis of cellulose when used in association with water and cellulose will also, if the anhydrid of a monobasic fatty acid be substituted for the water, bring about esterification of the cellulose, provided that the said substances are such as can be obtained in an anhydrous condition. These substances act either in hydrolysis or in esterification in the manner peculiar to condensing agents in so far as they are essential to the reaction between cellulose and water or cellulose and the fatty acid anhydrid, and yet do not themselves lose their integrity as a result of the reaction. Agents which effect hydrolysis under the conditions set forth are available as esterizing agents in the anhydrous condition, and the process of esterification may be carried on by their aid at such low temperatures that the molecular aggregation and integrity peculiar to cellulose is conserved in the ester.

In practice I carry on the process at temperatures lower than 100° centigrade and usually at about 70° centigrade.

I have discovered specifically that the addition of sufficiently minute quantities of sulfuric acid to the anhydrid of a monobasic fatty acid not only enables one to form the corresponding cellulose ester directly from cellulose in its normal highly aggregated and fibrous form by treatment of the cellulose—as, for example, cotton—with the anhydrid containing this minute addition of sulfuric acid, but, further, that the reaction proceeds easily in a short time and with the best results at comparatively low temperatures—as, for ininstance, at temperatures not exceeding 70° centigrade.

So far as I have been able to ascertain the lowest degree of esterification practically or substantially obtainable by my process, as exemplified by the acetate process, is the diproduct as the diacetate, and from this my process is capable of forming under the regulation and manipulation described below the higher products, notably tri and tetra products. I believe that in my product, however, there will be found two and perhaps three of these products together, one or the other preponderating to a greater or less degree according to the previous regulation of time, quantity, and temperature conditions, as hereinafter set forth.

The practice of my invention, therefore, avoids entirely the initial degradation and breaking down of the cellulose which often accompanies the conversion of the cellulose into hydrate or similar modifications. It saves the trouble, expense, and time involved in effecting this conversion and removes all necessity for the employment of restrainers or diluents with the complications or expense which their presence involves. It minimizes the dangers of hydrolysis, since the reaction goes forward easily at comparatively low temperatures, and by thus conserving the integrity of the cellulose molecule and its aggregations yields a product in nearly theoretically complete quantity and possessing in a high degree the valuable physical properties of the cellulose esters.

In carrying out my invention—as, for example, in the preparation of cellulose acetate—I prefer to proceed as follows: To a quantity of glacial acetic acid, which is the nearly-pure acid, containing commonly about one-half of one per cent. of water, is added sufficient sulfuric anhydrid ($SO_3$) to unite with the small quantity of water present in the acetic acid. The quantity of acetic acid taken is preferably only sufficient to moisten thoroughly the cellulose to be treated. To the acetic acid thus prepared add acetic anhydrid in the quantity molecularly requisite or nearly so for the formation of cellulose tetracetate with the cellulose first taken. The whole is then mixed together to form a moist pulp. The employment of the chemical equivalent necessary theoretically to the formation of the tetracetate insures a practically sufficient excess over the chemical equivalent requisite theoretically to the formation of the triacetate so as to initiate and accomplish the formation of an ester in which triacetate is largely preponderant. I have found that under these conditions or, specifically, in the presence of this minute quantity of sulfuric acid the desired reaction soon begins even at the ordinary temperature, the beginning of the reaction being characterized by a preliminary swelling of the pulpy mass. The reaction is accelerated by a moderate heating, and if the temperature of the reacting mass is raised to about 70° centigrade is complete in about two hours. At the end of this time the ester resulting will be found to contain triacetate in largely preponderant quantity with probably a small proportion of tetracetate. If, however, the reaction be prolonged, the excess of anhydrid over and above the theoretical equivalent for the formation of triacetate will then assert its presence, and the proportion of tetracetate will then increase progressively, even to a large preponderance over the triacetate; or if the temperature was originally maintained at higher temperature than 70° centigrade (but not higher than 100° centigrade) the activity of the reaction will result in the prompt formation of tetracetate in sensible quantities, even in preponderance over the triacetate. Similarly if tetracetate is the desired product I find it advisable to employ in the preliminary mixture an excess of anhydrid over and above the quantity theoretically requisite to the formation of tetracetate—for instance, the theoretical quantity for pure acetate. Then the process above prescribed will yield a substantially pure tetracetate. If an excess of the acetylizing mixture has been employed, the cellulose tetracetate goes into a sirupy solution.

It is desirable on the completion of the reaction to remove the ester from further contact with the reagents used for esterification, since they tend further to react upon the ester, forming other products of acetylation possessing less desirable physical and chemical properties than the normal product of the reaction. For this reason I prefer as soon as the reaction is complete to pour the entire mixture into water, in which the ester is precipitated. It should then be thoroughly washed with water and afterward dried. The ester thus obtained dissolves readily in its appropriate solvents and yields by the evaporation of its solution tenuous and flexible films, or more brittle products if the more complex or higher esters have been produced. The cellulose acetate, for example, obtained by the foregoing specific application of my process is freely soluble in chloroform and its chloroform solution yields on evaporation perfect films which are clear, waterproof, and flexible and which may be extremely thin.

If in any case the reaction has been permitted to proceed too far, so that a product is obtained which fails to produce a film, or at best forms an unserviceable film, the error may safely be corrected on repetition by reducing the temperature or decreasing the quantity of sulfuric acid employed.

The hereinbefore-described method of carrying out my process, in which sulfuric anhydrid is added to glacial acetic acid, has the advantages of supplying a measure of the quantity of sulfuric acid to be added; but the sulfuric acid or other esterizing agent may be added in the previously-ascertained suitable small amount directly to the anhyrid, such as acetic anhydrid, and the process carried out with fibrous cellulose at low temperatures and in the same short time as previously described, but without the addition of the monobasic fatty acid, such as acetic acid, or for the anydrid may be substituted other reagents, from which under the conditions of my process the anhydrid may be derived.

I have found that one drop of pure sulfuric acid in forty cubic centimeters of acetic anhydrid—in other words, about one part of acid in four hundred parts of anhydrid—produces a satisfactory reaction with the quantity of cellulose molecularly equivalent (allowing for a proper excess to initiate the combination) to the anhydrid, in view of the particular ester (whether a di, tri, or tetra product, for instance) which it is desired shall preponderate at temperatures below 100° centigrade and preferably between 60° and 70° centigrade.

Taking in any case the quantity of acetic anhydrid molecularly equivalent, as aforesaid, to the cellulose to be treated, I have found that a proportion of sulfuric acid no greater than one-fifth of one per cent., by weight, relatively to the anhydrid will suffice to bring about the direct reaction. These directions may be safer to follow than the one above given in connection with the glacial acetic-acid method of determining the quantity of sulfuric acid; furthemore, that the proportion of water in the glacial acid is not certain. In case it is desired to use glacial acetic acid to assist in moistening the pulp, the quantity of acid to be used may safely be determined by first ascertaining the proportion of water in the acid and then using the quantity which will on treatment with sulfuric anhydrid produce the proper proportion of sulfuric acid relatively to the quantity of acetic anhydrid which is molecularly equivalent, as aforesaid, to the cellulose to be treated.

The anhydrids of the fatty acids may be derived from reagents in such manner that the reagent may be employed directly, yielding the anhydrid as required for the purpose of the process, and it may be found desirable to employ a reagent susceptible of yielding the anhydrid of the fatty acid instead of the anhydrid itself. For instance, if the fatty acid itself in the pure condition represented by glacial acetic acid is brought into contact with cellulose in the presence of an esterizing agent, such as defined above, under conditions which render the acid susceptible of yielding the anhydrid, then, as might be expected, the ester will be formed without the employment of previously-prepared anhydrid.

As an example of the use of a reagent from which the anhydrid may be derived for the purposes of this process, take about thirty-five cubic centimeters of glacial acetic acid through which $SO_3$ has been passed or to which $H_2SO_4$ has been added, as above described, and add thereto phosphoric acid anhydrid ($P_2O_5$) in quantity based on the hypothesis that phosphoric acid and acetic anhydrid will be formed, practically exhausting the acetic acid, and with this resulting liquid moisten a mass of dry cellulose, having reference to the particular ester desired as a product. The quantity of cellulose should be chemically equivalent, or nearly so, to the acetic anhydrid produced or theoretically capable of being produced. Warm the pulp gently to about 70° centigrade. The pulp goes into solution and on being washed with water precipitates the film-producing acetate. In carrying out the process of esterification the esterizing agent should be regulated as to proportionate quantity to meet varying conditions of temperature. If the process is carried on with cold ingredients, a quantity of the esterizing agent may safely be employed which under higher temperature conditions would be liable to develop the consequences of excess by carrying the reaction too far and breaking down the cellulose molecule or its aggregations or forming highly-complex esters which may be unsuited to the uses contemplated.

What I claim, and desire to secure by Letters Patent, is—

1. The method of forming cellulose esters which consists in treating cellulose at temperatures lower than 100° centigrade, with the anhydrid of a monobasic fatty acid in the presence of an anhydrous substance which if associated with water and cellulose will bring about hydrolysis of cellulose.

2. The method of forming cellulose esters which consists in treating fibrous cellulose at temperatures lower than 100° centigrade, with the anhydrid of a monobasic fatty acid in the presence of an anhydrous substance which if associated with water and cellulose will bring about hydrolysis of cellulose.

3. The method of forming cellulose esters which consists in treating cellulose at temperatures lower than 100° centigrade with a reagent from which the anhydrid of a monobasic fatty acid may be derived, in the presence of an anhydrous substance which if associated with water and cellulose will bring about hydrolysis of cellulose.

4. The method of forming cellulose esters which consists in treating fibrous cellulose at temperatures lower than 100° centigrade with a reagent from which the anhydrid of a monobasic fatty acid may be derived, in the presence of an anhydrous substance which if associated with water and cellulose will bring about hydrolysis of cellulose.

5. The method of obtaining cellulose esters which consists in treating cellulose with the anhydrid of a monobasic fatty acid in the presence of sulfuric acid at temperatures below 100° centigrade.

6. The method of obtaining cellulose esters which consists in treating fibrous cellulose with the anhydrid of a monobasic fatty acid in the presence of sulfuric acid at temperatures below 100° centigrade.

7. The method of obtaining cellulose esters which consists in treating cellulose at temperatures below 100° centigrade, in the presence of sulfuric acid with a reagent from which the anhydrid of a fatty acid may be derived.

8. The method of obtaining cellulose esters which consists in treating fibrous cellulose at temperatures below 100° centigrade, in the presence of sulfuric acid with a reagent from which the anhydrid of a fatty acid may be derived.

9. The method of forming cellulose acetate which consists in treating cellulose with acetic anhydrid at temperatures below 100° centigrade, in the presence of sulfuric acid.

10. The method of forming cellulose acetate which consists in treating fibrous cellulose with acetic anhydrid at temperatures below 100° centigrade, in the presence of sulfuric acid.

11. The method of obtaining cellulose acetate which consists in treating cellulose with a mixture of acetic anhydrid and glacial acetic acid to which sulfuric anhydrid has been added.

12. The method of obtaining cellulose acetate which consists in treating cellulose at temperatures below 100° centigrade, with a mixture of acetic anhydrid and glacial acetic acid to which sulfuric anhydrid has been added.

13. The method of obtaining cellulose acetate which consists in treating fibrous cellulose with a mixture of acetic anhydrid and glacial acetic acid to which sulfuric anhydrid has been added.

14. The method of obtaining cellulose acetate which consists in treating fibrous cellulose at temperatures below 100° centigrade, with a mixture of acetic anhydrid and glacial acetic acid to which sulfuric anhydrid has been added.

15. The method of obtaining cellulose acetate which consists of treating fibrous cellulose with a mixture of acetic anhydrid and a liquid formed by adding sulfuric anhydrid to glacial acetic acid, maintaining the reaction from two to three hours at a temperature of about 70° centigrade, washing the solution with water and drying the resulting precipitate.

Signed by me at Boston, Massachusetts, this 24th day of May, 1901.

GEORGE W. MILES.

Witnesses:
 ODIN B. ROBERTS,
 FRANK S. HARTNETT.